United States Patent [19]
Smith et al.

[11] Patent Number: 5,470,104
[45] Date of Patent: Nov. 28, 1995

[54] FLUID FUELED AIR BAG INFLATOR

[75] Inventors: Bradley W. Smith, Ogden; Karl K. Rink, Liberty, both of Utah

[73] Assignee: Morton International, Inc., Chicago, Ill.

[21] Appl. No.: 252,036

[22] Filed: May 31, 1994

[51] Int. Cl.$^6$ ................................................ B60R 21/26
[52] U.S. Cl. .............................. 280/737; 280/741; 222/5
[58] Field of Search ........................ 280/737, 741, 280/742, 736; 422/164, 165, 166; 102/530, 531; 149/87; 222/3, 5

[56] References Cited

U.S. PATENT DOCUMENTS

| | | | |
|---|---|---|---|
| 3,817,263 | 6/1974 | Bendler et al. | 137/68.1 |
| 3,822,895 | 7/1974 | Ochiai | 280/737 |
| 3,901,530 | 8/1975 | Radke | 280/741 |
| 4,104,092 | 8/1978 | Mullay | 149/2 |
| 4,246,051 | 1/1981 | Garner et al. | 149/7 |
| 4,341,651 | 7/1982 | Beckert et al. | 149/87 |
| 4,561,675 | 12/1985 | Adams et al. | 280/741 |
| 5,060,973 | 10/1991 | Giovanetti | 280/736 |
| 5,263,740 | 11/1993 | Frey et al. | 280/737 |
| 5,290,060 | 3/1994 | Smith | 280/737 |
| 5,301,979 | 4/1994 | Allard | 280/741 |
| 5,330,730 | 7/1994 | Brede et al. | 422/305 |
| 5,344,186 | 9/1994 | Bergerson | 280/741 |
| 5,348,344 | 9/1994 | Blumenthal et al. | 280/737 |
| 5,350,192 | 9/1994 | Blumenthal | 280/737 |
| 5,356,176 | 10/1994 | Wells | 280/737 |
| 5,364,127 | 11/1994 | Cuevas | 280/741 |

FOREIGN PATENT DOCUMENTS

| | | |
|---|---|---|
| 0540013 | 5/1993 | European Pat. Off. . |
| 0604001 | 6/1994 | European Pat. Off. . |
| 2112006 | 8/1977 | Germany . |
| 4135547 | 4/1993 | Germany . |
| 4135776 | 5/1993 | Germany . |
| 2270742 | 3/1994 | United Kingdom . |

Primary Examiner—Margaret A. Focarino
Assistant Examiner—Paul N. Dickson
Attorney, Agent, or Firm—Nick C. Kottis; Gerald K. White

[57] ABSTRACT

An apparatus and method for inflating a vehicular inflatable device adaptable to a variety of fuels and oxidants wherein a fluid fuel is burned and mixed with stored, pressurized gas to produce inflation gas containing little or no particulate.

43 Claims, 6 Drawing Sheets

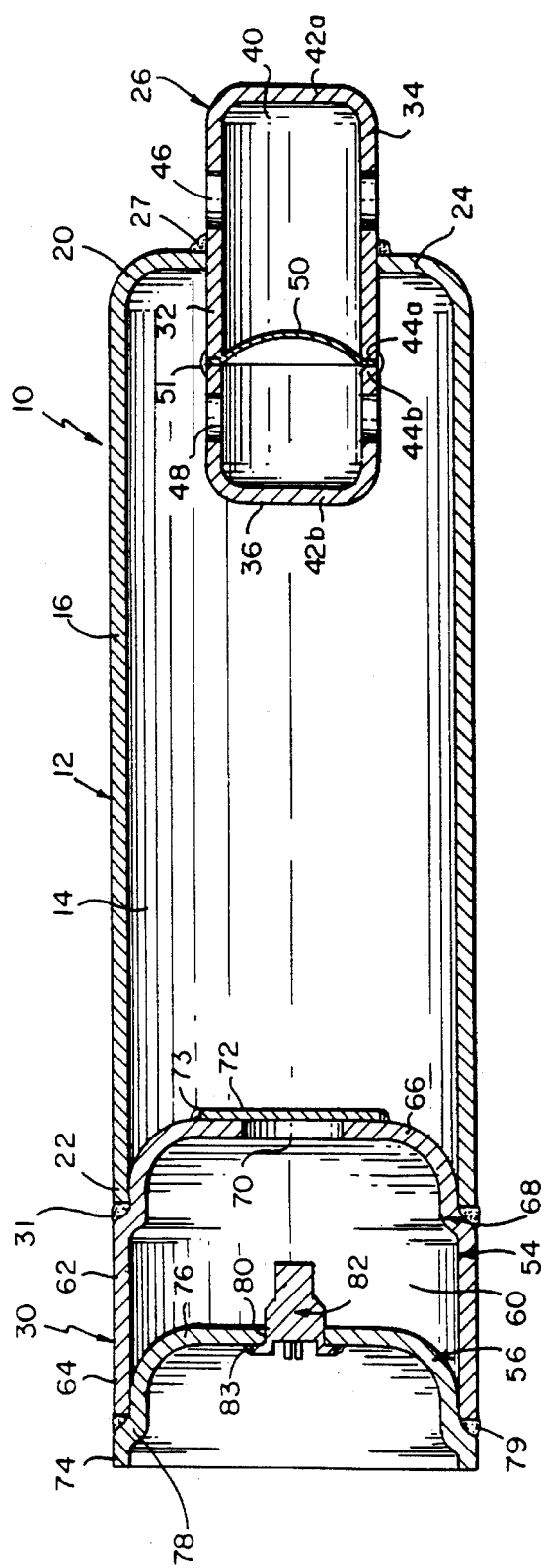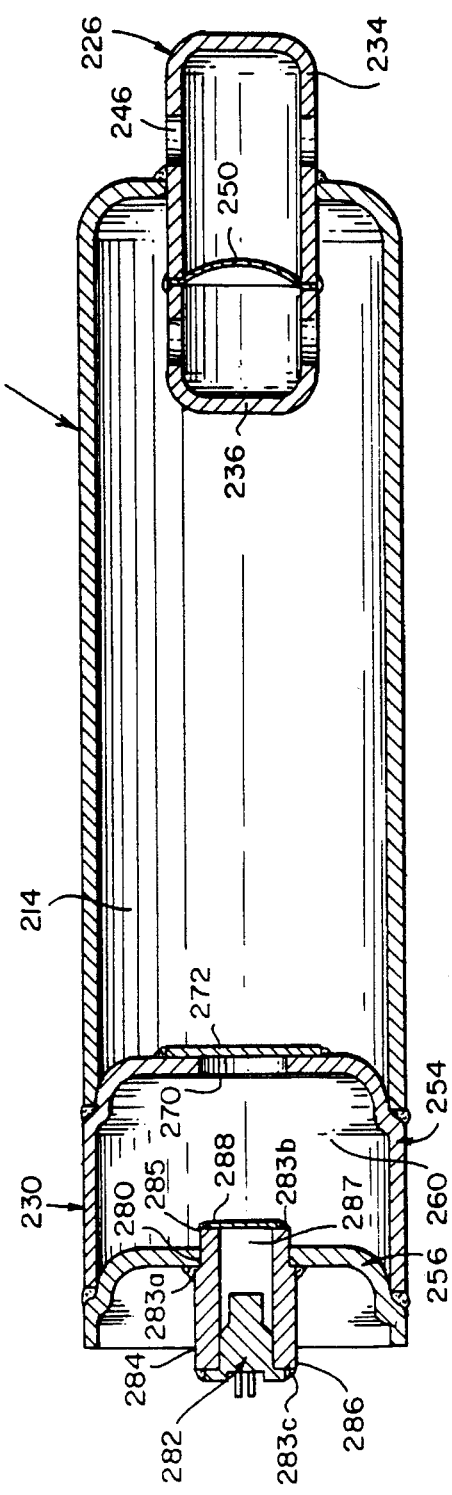

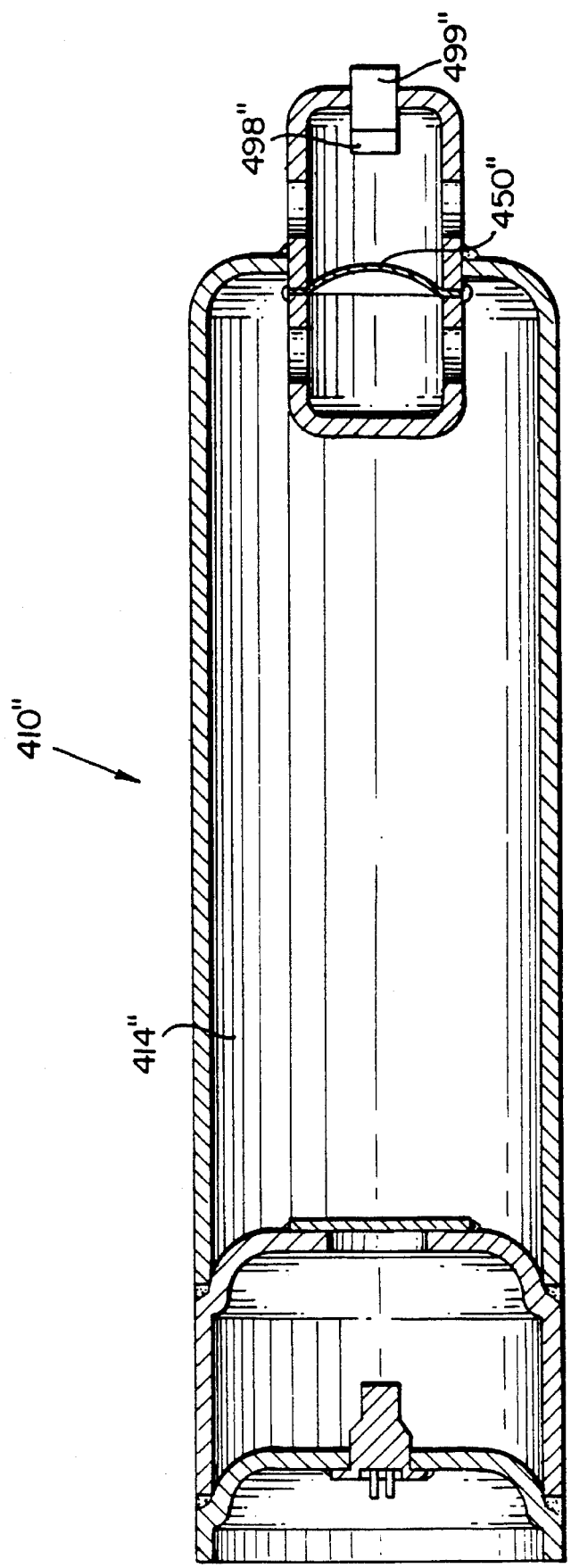

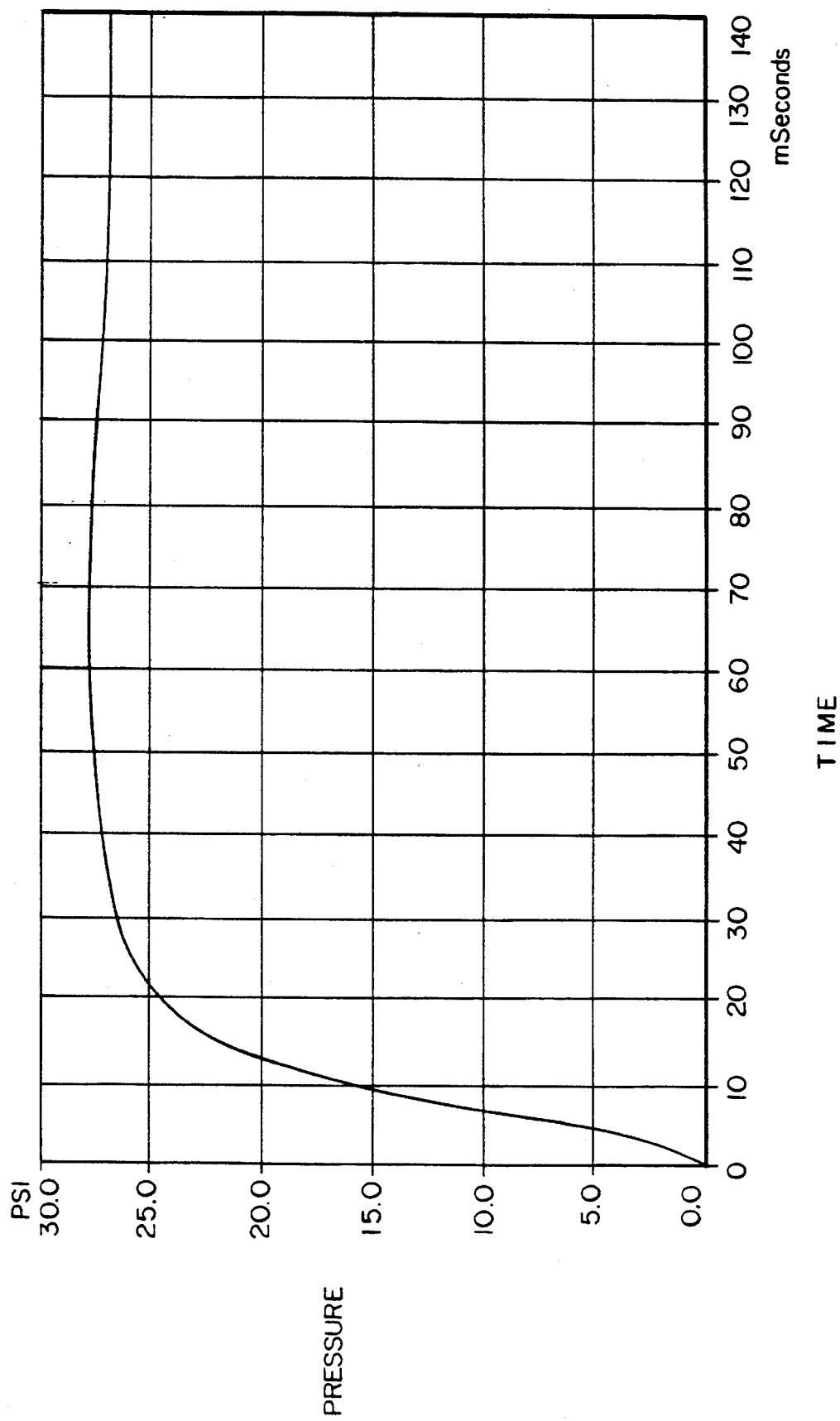

5,470,104

FLUID FUELED AIR BAG INFLATOR

BACKGROUND OF THE INVENTION

This invention relates generally to inflatable restraint systems and, more particularly, to an apparatus and method for inflating an inflatable device such as an inflatable vehicle occupant restraint for use in such systems.

Many types of inflator devices have been disclosed in the art for inflating an air bag for use in an inflatable restraint system. One type of inflator device involves the utilization of a quantity of stored compressed gas which is selectively released to inflate the air bag. To properly inflate a typical air bag at an appropriate rate, such a type of device commonly requires the storage of a relatively large volume of gas at relatively high pressures. As a result of the high pressures, the walls of the gas storage chamber are typically relatively thick for increased strength. The combination large volume and thick walls results in relatively heavy and bulky inflator designs. In addition, a technique designed to initiate the release of the stored gas into the air bag must be devised.

Another type of inflator device derives a gas source from a combustible gas generating material which, upon ignition, generates a quantity of gas sufficient to inflate the air bag. Typically, such gas generating materials can produce various undesirable combustion products, including various solid particulate materials. The removal of such solid particulate material, such as by the incorporation of a filtering device within the inflator, undesirably increases inflator design and processing complexity and can increase the costs associated therewith.

In addition, the temperature of the gaseous emission of such inflator devices can typically vary between about 500° F. (260° C.) and 1200° F. (649° C.), dependent upon numerous interrelated factors including the level of inflator performance being sought, as well as the type and amount of gas generant used therein, for example. Consequently, air bags used in conjunction therewith typically are constructed of or coated with a material resistant to such high temperatures. For example, an air bag such as constructed of nylon fabric, in order to resist burn through as a result of exposure to such high temperatures, can be prepared such that the nylon fabric air bag material is coated with neoprene or one or more neoprene coated nylon patches are placed at the locations of the air bag at which the hot gas initially impinges. As will be appreciated, such specially fabricated or prepared air bags typically are more costly to manufacture and produce.

Further, while vehicular inflatable restraint systems are preferably designed to be properly operational over a broad range of conditions, the performance of such inflator device designs can be particularly sensitive to changes in the ambient conditions, especially temperature. For example, operation at very low temperatures, such as temperatures of −40° F. (−40° C.), can effect the performance of various propellants, and thus lower air bag pressure resulting from an inflator which contains a fixed available amount of propellant.

In a third type of inflator device, air bag inflating gas results from a combination of stored compressed gas and combustion of a gas generating material. The last mentioned type is commonly referred to as an augmented gas or hybrid inflator. Hybrid inflators that have been proposed heretofore are subject to certain disadvantages. For example, inflator devices of such design typically result in a gas having a relatively high particulate content.

Various specific inflator devices and assemblies have been proposed in the prior art. U.S. Pat. No. 5,263,740 discloses an assembly wherein within a single chamber is stored both an inflation gas and a first ignitable material, which is subsequently ignited therein.

The storage of both an inflation gas and an ignitable material within a single chamber increases the potential for the release of ignitable material into the air bag prior to the complete ignition thereof as well as increasing the relative amount of incomplete products of combustion released into the air bag. Also, gas generators wherein, for example, a fuel and an oxidant are stored in a single chamber, can under certain extreme circumstances be subject to autoignition (i.e., self-ignition) and the consequent dangers that may be associated therewith. Also, as the gas mixture resulting from such a single storage chamber assembly will typically be at a relatively high temperature, such designs can be subject to the same or similar shortcomings identified above associated with high temperature emissions.

Thus, there is a need and a demand for improvement in air bag inflators to the end of overcoming the foregoing disadvantages. More particularly, there is a need for the provision of air bag inflation gas at a relatively low temperature and having a relatively low concentration of undesirable combustion products, especially particulate matter. Further, there is a need for an inflator device of simple design and construction which device is effectively operable using a variety of fuels, oxidants, and stored gases. In addition, there is a need for an inflator design that reduces or eliminates the potential of autoignition of an inflation gas/ignitable material mixture. Still further, there is a need for the provision of air bag inflation gas containing no more than limited amounts of oxygen gas and moisture, thereby avoiding or minimizing the problems associated therewith. The present invention was devised to fill the gap that has existed in the art in certain of these respects.

SUMMARY OF THE INVENTION

A general object of the invention is to provide an improved apparatus and method for inflating an inflatable device such as an inflatable restraint for occupants of motor vehicles.

A more specific objective of the invention is to overcome one or more of the problems described above.

The general object of the invention can be attained, at least in part, through an inflatable device inflation apparatus which includes first and second chambers and initiator means for initiating the burning of at least one fluid fuel and at least one oxidant in the first chamber to produce combustion products including hot combustion gas. The first chamber includes at least one gas exit opening and has sealing means normally closing the gas exit opening. The combustion of the fluid fuel and the oxidant increases the temperature and pressure within the first chamber.

Included are opening means to open the first chamber sealing means whereby at least a portion of the hot combustion gas is expelled from the first chamber. Upon the opening of the gas exit opening sealing means, the second chamber, which chamber contains a supply of pressurized stored gas, is in fluid communication with the first chamber, with the hot combustion gas expelled from the first chamber mixing with the pressurized stored gas to produce inflation gas.

The second chamber includes at least one gas exit port and has sealing means normally closing the gas exit port. The mixing of the hot combustion gas with the pressurized stored gas increases the temperature and pressure within the second chamber.

Also included are opening means to open the second chamber sealing means whereby at least a portion of the inflation gas is expelled from the second chamber to inflate the device.

The prior art fails to provide air bag inflation gas at a sufficiently low temperature and having a sufficiently low concentration of undesirable products of combustion, e.g., incomplete products of combustion and/or particulate matter. In addition, safety and handling concerns such as those associated with the single chamber storage of an inflation gas/ignitable material mixture are not completely satisfied by prior art devices. Further, prior art devices are typically operational only with a very narrow variety of fuels and oxidants, typically useable in only very limited relative amounts.

The invention further comprehends an inflatable device inflation apparatus which includes a fluid fuel storage element storing at least one fluid fuel free of oxidant, first and second chambers, and initiator means for initiating the burning of the fluid fuel and at least one oxidant in the first chamber to produce combustion products including hot combustion gas.

The first chamber includes at least one gas exit opening and has sealing means normally closing the gas exit opening. The combustion of the fluid fuel and the oxidant increases the temperature and pressure within the first chamber.

Included are opening means to open the first chamber sealing means whereby at least a portion of the hot combustion gas is expelled from the first chamber. Upon the opening of the gas exit opening sealing means, the second chamber, which chamber contains a supply of pressurized stored gas, is in fluid communication with the first chamber, with the hot combustion gas expelled from the first chamber mixing with the pressurized stored gas to produce inflation gas.

The second chamber includes at least one gas exit port and has sealing means normally closing the gas exit port. The mixing of the hot combustion gas with the pressurized stored gas increases the temperature and pressure within the second chamber.

Also included are opening means to open the second chamber sealing means whereby at least a portion of the inflation gas is expelled from the second chamber to inflate the device.

The invention still further comprehends a method for inflating an inflatable safety device in a vehicle. The method involves the step of burning at least one fluid fuel with at least one oxidant in a first sealed chamber to produce combustion products including hot combustion gas. The first sealed chamber includes at least one gas exit opening normally closed by a sealing means, and the burning increases the temperature and pressure within the chamber. The chamber sealing means are then opened to expel the hot combustion gas from the first chamber into a second chamber which includes at least one gas exit port normally closed by a sealing means and which contains a supply of pressurized stored gas. The expelled hot combustion gas are mixed with the pressurized stored gas in the second chamber to produce inflation gas. The mixing increases the temperature and pressure within the second chamber. The port sealing means are subsequently opened to expel the inflation gas from the second chamber to inflate the inflatable safety device.

As used herein, references to a chamber or volume as being "free of combustion oxidant" are to be understood to refer to a chamber or volume sufficiently free of oxidant such that, over the range of pressures and temperatures experienced during the storage of the fluid fuel therein, the amount of heat liberated by chemical reaction (since the chemical reaction rate is non-zero for all temperatures) is less than the amount of heat dissipated to the surroundings. It will be appreciated that as the rate of such chemical reaction (and hence the amount of heat liberated upon reaction) is dependent on the concentration of oxidant as well as the temperature, the amount of heat liberated can be minimized through proper control of the quantity of oxidant initially present therein.

The term "equivalence ratio" ($\phi$) is commonly used in reference to combustion processes. Equivalence ratio is defined as the ratio of the actual fuel to oxidant ratio $(F/O)_A$ divided by the stoichiometric fuel to oxidant ratio $(F/O)_s$:

$$\phi=(F/O)_A/(F/O)_s$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.) In general, for given temperature and pressure conditions, fuel and oxidant mixtures are flammable over only a specific range of equivalence ratios.

Other objects and advantages will be apparent to those skilled in the art from the following detailed description taken in conjunction with the appended claims and drawings.

BRIEF DESCRIPTION OF THE DRAWINGS

Each of FIGS. 1–4 and 4' are simplified, partially in section schematic drawings of fluid fueled inflators in accordance with alternative embodiments of the invention.

Figure 5C:
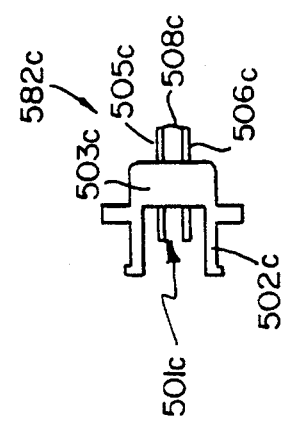
Figure 5B:
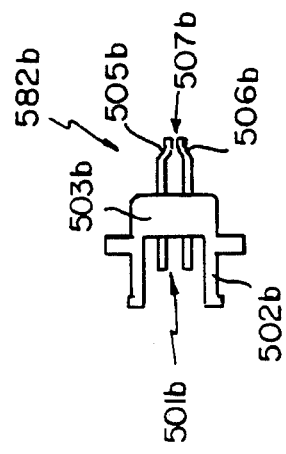
Figure 5A:
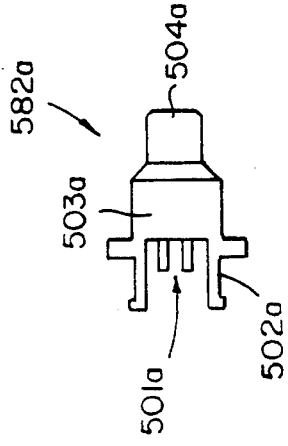
Figure 6:
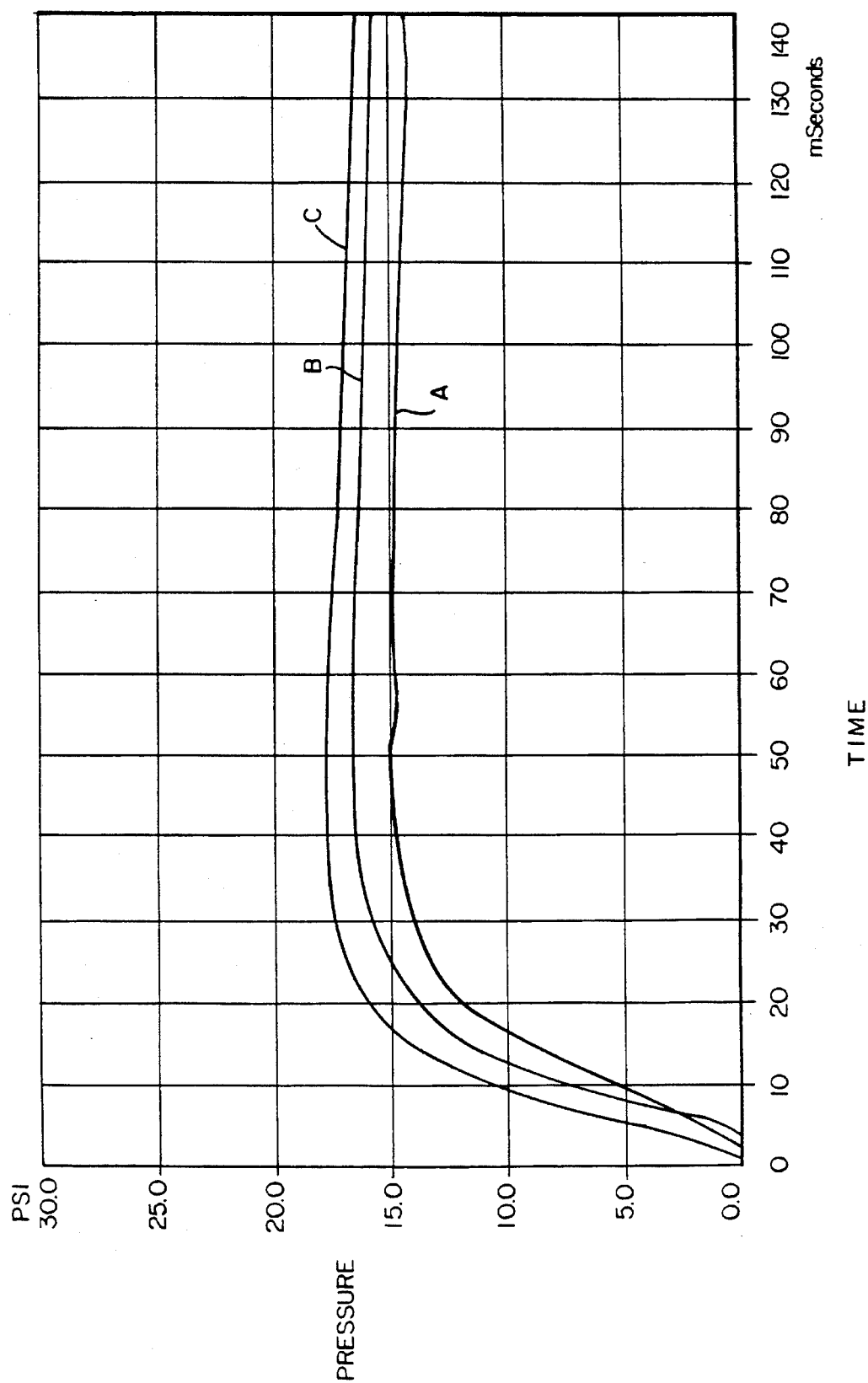

Each of FIGS. 5A, 5B, and 5C are simplified schematic drawings of alternative initiator devices for use in a fluid fueled inflator in accordance with the invention;

FIG. 6 shows the tank pressure versus time performance of a fluid fueled inflator in accordance with one embodiment of the invention, with the inflator conditioned at hot, room and cold temperatures; and FIG. 7 shows the tank pressure versus time performance of a fluid fueled inflator in accordance with an alternative embodiment of the invention at room temperature.

DETAILED DESCRIPTION OF THE INVENTION

Referring initially to FIG. 1, there is illustrated a fluid fueled inflator assembly 10 for inflating a vehicle occupant restraint, such as an air bag. It will be understood that the invention described hereinafter has general applicability to various types or kinds of air bag assemblies including driver side and passenger side air bag assemblies for automotive vehicles including vans, pick-up trucks, and particularly automobiles.

The inflator assembly 10 comprises a pressure vessel 12 including a storage chamber 14 that is filled and pressurized with an inert gas such as argon or nitrogen to a pressure typically in the range of 2000–4000 psi.

The chamber 14 is defined by an elongated generally cylindrical sleeve 16, having a first and a second end, 20 and 22, respectively. The first end 20 is partially closed by means of an integral shoulder portion 24. A diffuser assembly 26 is attached by a circumferential weld 27 in sealing relation to the sleeve first end 20. A combustion chamber assembly 30 is attached by a circumferential weld 31 in sealing relation to the sleeve second end 22.

The diffuser assembly 26 comprises a generally cylindrical sleeve 32 having a cap portion 34 and a base portion 36 to define a diffusion chamber 40. Each of the diffuser assembly cap and base portions, 34 and 36, respectively, include a closed first end 42a and 42b, respectively, and an open second end 44a and 44b, respectively. The diffuser assembly cap portion 34 includes a plurality of openings 46, adjacent the closed cap first end 42a, for dispensing inflation gas from the inflator assembly into an air bag assembly (not shown). The diffuser assembly base portion 36 additionally includes a plurality of openings 48, adjacent the closed base first end 42b, for passage of inflation gas from the storage chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the storage chamber 14 from the air bag.

The combustion chamber assembly 30 comprises a cap portion 54 and a base portion 56 to define a combustion chamber 60. Within the combustion chamber 60 is stored one or more fluid fuels and one or more oxidants, forming a flammable mixture. In practice of this aspect of the invention, the one or more fuels and one or more oxidants are together such as in intimate contact and at relatively high pressure (e.g., 500 to 2000 psi (3.4 to 13.8 MPa), preferably 900 to 1600 psi (6.2 to 11.0 MPa)). As with the gas stored in the storage chamber 14, storage of gas within the combustion chamber 60 at relatively high pressures advantageously helps minimize the overall size of the inflator as well as minimize ignition delay, thereby resulting in higher and faster performance by the inflator assembly, as well as resulting in more complete combustion, such as through increased temperature and, hence, reaction rates. In addition, such an inflator assembly results in reduced or no emission of incomplete products of combustion.

The combustion chamber cap portion 54 includes a sleeve 62, constituting a side wall 64 with a dome 66 joined thereto via a cap shoulder connecting potion 68. The combustion chamber dome 66 includes an orifice, referred to herein as a gas exit opening 70. The gas exit opening 70 is normally closed by sealing means, e.g., by means of a rupture disc 72 joined in sealing relation with the combustion chamber dome 66 by means of a circumferential weld 73 at the periphery of the disc 72.

The combustion chamber dome 66 is generally designed to withstand the internal pressures generated upon the combustion of the flammable mixture within the combustion chamber 60. In the static state, the disc serves in maintaining the gas storage chamber 14 in a sealed condition.

The combustion chamber base portion 56 includes a base ring 74 with a base cap 76 joined thereto via a base shoulder connecting portion 78. The base shoulder connecting portion 78 serves as a convenient means of locating the combustion chamber base portion 56 relative to the combustion chamber sleeve 62, as well as providing a location for a circumferential weld 79 whereby the combustion chamber assembly base portion 56 is attached in sealing relation to the combustion chamber cap portion 54.

The base cap 76 includes an opening 80 therein, wherethrough an initiator device 82, such as described in greater detail below, is attached in sealing relation within the combustion chamber 60 via a weld 83.

In operation, such as upon the sensing of a collision, an electrical signal is sent to the initiator device 82. As will be described in greater detail below, the initiator device will in the appropriate selected manner initiate the combustion of the fluid fuel and oxidant mixture housed within the combustion chamber 60.

The hot gas produced upon the burning of the flammable mixture results in a rapid pressure rise within the combustion chamber 60. When the gas pressure within the combustion chamber 60 exceeds the structural capability of the rupture disc 72, the disc ruptures or otherwise permits the passage of the hot gas through the gas exit opening 70 and into the storage chamber 14. Wherein, the hot combustion gas expelled from the combustion chamber 60 mixes with the pressurized gas stored within the separate storage chamber 14 to produce inflation gas for use in inflating the inflatable device, e.g., an air bag. It will be appreciated that augmenting the combustion gas with the stored inert gas produces an inflation gas having both a lower temperature and reduced byproduct concentration (e.g., $CO$, $NO_x$, $H_2O$, etc.) than the combustion gas alone.

When the gas pressure within the storage chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the air bag assembly.

The fluid fuels useable in such an apparatus include a wide range of gases, vapors, and liquids such that, when used with one or more suitable oxidants in proper proportion(s) at selected conditions (either alone or in conjunction with one or more inert gases) form a flammable mixture. Such fuels include hydrogen, as well as hydrocarbon-based fuels such as hydrocarbon and hydrocarbon derivative fuels. For example, hydrocarbon fuels such as those constituting napthenes, olefinic and paraffinic hydrocarbon groups, particularly $C_1$–$C_4$ paraffinic hydrocarbon fuels and including, for example, gasoline and kerosene, can be used in the practice of the invention. In addition, hydrocarbon derivative fuels such as those constituting various alcohols, ethers, and esters, for example, those containing four or fewer carbon atoms and in particular, alcohols such as ethyl and propyl alcohol can advantageously be used in the practice of the invention.

It will be appreciated that the fuel may include therewith in limited proportions materials, such as water, that are normally not considered to be fuels. This is particularly true for those fuel materials for which complete water separation is not normally practically realizable. Additionally, the presence of water in minor amounts, e.g., less than about 10 vol %, typically between about 4–8 vol %, can beneficially reduce the possibility of undesired autoignition of the inflator assembly without significantly effecting the low temperature performance of the assembly.

It is also to be appreciated that various fuel materials can, if desired, be used mixed together. This is particularly true for those fuel materials for which complete separation is not normally practically realizable. For example, a fuel which has been used includes about 80% ethyl alcohol, 8–10% methyl alcohol, and 4–8% water, with the balance constituting other various hydrocarbon species. An example of such a fuel material is the denatured ethanol, "ANHYDROL SOLVENT SPECIAL, PM-4061, 190 Proof", sold by Union Carbide Chemicals and Plastics Company Inc.

Oxidants useable in the invention include various oxygen-containing gases including, for example, pure oxygen, air, diluted air, and oxygen combined with one or more gas diluents such as nitrogen, carbon dioxide, and noble gases such as helium, argon, xenon. In practice, the use of pure oxygen ($O_2$) may be disadvantageous for a number of reasons including: 1) from a production viewpoint, such use may present handling difficulties, 2) such use can magnify autoignition difficulties, 3) when combined with the proper amounts of fuel (stoichiometric or near stoichiometric, $0.8 \leq \phi \leq 1.2$), extremely high flame temperatures can result (especially at the elevated pressures commonly associated with such inflator designs, and 4) at equivalence ratios of less than 0.8, excess quantities of oxygen and carbon monoxide can cause concern.

In view thereof, mixtures of argon and oxygen may be preferred. Argon advantageously is relatively: 1) inert, 2) inexpensive, 3) safe, and 4) easy to handle. The preferred relative amounts of the components of such a mixture will in general be dependent on factors such as the inflator geometry and the particular fuels used therein. For example, an oxidant mixture of 50–65 vol % oxygen with the balance being argon can advantageously be used with ethyl alcohol-based fuel-containing assemblies.

It will also be appreciated that such oxidant mixtures can be used in conjunction with minor amounts of air, such as may be initially present in the chamber to be filled with oxidant, prior to the addition of the oxidant therein.

Thus, the invention permits the use of a wide range of fuels in a variety of forms (including gaseous and liquid) and a wide variety of oxidant species, and also a wide range of relative amounts of fuel and oxidant species.

In general, the inflator assemblies of the invention are preferably operated with equivalence ratios in the range of $0.4 \leq \phi \leq 1.6$, preferably in the range of $0.6 \leq \phi \leq 1.1$.

Figure 3:
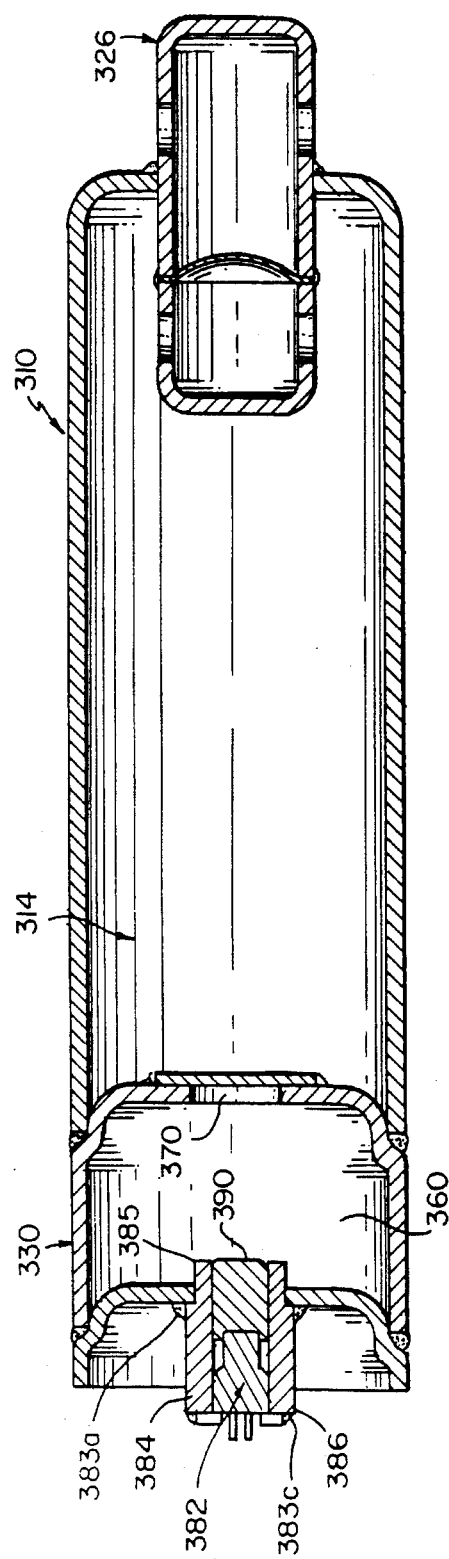

FIGS. 2 and 3 illustrate fluid fueled inflator assemblies 210 and 310, respectively, similar to the inflator assembly 10 described above and each having a storage chamber, e.g., 214 and 314, respectively, a diffuser assembly, e.g., 226 and 326, respectively, and a combustion chamber assembly, e.g., 230 and 330, respectively.

The fluid fueled inflator assemblies 210 and 310, however, differ from the inflator assembly 10 in that each of these assemblies, as described in greater detail below, include a separate fluid fuel storage element to store fluid fuel free of combustion oxidant, such as may be desired to facilitate the long term storage, e.g., such as storage for 10 to 15 or more years.

Specifically, as shown in FIG. 2, the combustion chamber assembly 230 of the fluid fueled inflator assembly 210 though also including similar combustion chamber assembly cap and base portions, 254 and 256, respectively, includes an annular cylindrical wall 284, having a first and a second end, 285 and 286, respectively, and defining a fuel chamber 287. The wall 284 is attached in sealing relation within the combustion chamber 260 via a weld 283a at the base cap opening 280. The first end 285 is normally closed by means of a rupture disc 288 joined in sealing relation therewith by means of a circumferential weld 283b at the periphery of the disc 288. To the second end 286 is attached, in sealing relation via a weld 283c, an initiator device 282. Within the fuel chamber 287 is stored the fluid fuel, separate and apart from the oxidant which is stored within the combustion chamber.

In the operation of such an assembly, such as upon the sensing of a collision, an electrical signal is sent to the initiator device 282. In such an assembly, the initiator device will preferably of a pyrotechnic type.

As will be described in greater detail below, pyrotechnic initiator devices can: 1) advantageously provide sufficient energy output to rupture the separation means separating the fuel from the oxidant, 2) adequately disperse and vaporize the fuel in the combustion chamber, and 3) provide sufficient residual heat to ignite the resulting fuel and oxidant mixture.

Such an initiator device will, upon receipt of an appropriate electrical signal, ignite and emit a hot, particle-laden discharge into the fuel storage chamber 287. In turn, the temperature and pressure of the fuel stored within the fuel storage chamber 287 will increase.

When the gas pressure within the fuel storage chamber 287 exceeds the structural capability of the rupture disc 288, the disc ruptures or otherwise permits the passage of the hot fuel through the first end 285 and into the combustion chamber 260. In the combustion chamber 260, the hot fuel mixes with oxidant and ignites and burns at an elevated temperature and pressure.

When the gas pressure within the combustion chamber 260 exceeds the structural capability of the rupture disc 272, the disc ruptures or otherwise permits the passage of the hot gas through the gas exit opening 270 and into the storage chamber 214. Wherein, the hot combustion gas expelled from the combustion chamber 260 mixes with the pressurized gas stored within the storage chamber 214 to produce inflation gas for use in inflating the inflatable device, e.g., an air bag.

When the gas pressure within the storage chamber 214 exceeds the structural capability of the rupture disc 250, the disc ruptures or otherwise permits the passage of the inflation gas through the diffuser base portion 236 and into the diffuser cap portion 234 and thus allows this inflation gas to vent through the openings 246 into the air bag assembly.

FIG. 3 illustrates a fluid fueled inflator assembly wherein the fluid fuel is stored in a separate fluid fuel storage element, free of combustion oxidant, in accordance with an alterative embodiment of the invention.

The fluid fueled inflator assembly 310, shown in FIG. 3, is similar to the inflator assembly 210 described above but, rather than including a fixed wall fuel storage element sealed, for example, by means of a rupture disc, includes a rupturable flexible wall bladder 390 contained within the combustion chamber 360, in close proximity to the initiator device 382.

As shown, the bladder 390 can be fitted within an annular cylindrical wall 384, having a first and a second end, 385 and 386, respectively. Similar to the assembly 210 of FIG. 2, the wall 384 is attached in sealing relation within the combustion chamber 360 via a weld 383a at the base cap opening 380. Similarly, an initiator device 382 is attached, in sealing relation via a weld 383c, to the second end 386. The first end 385, however, can be maintained in an open state as the fuel bladder 390 is fitted within the annular opening of the wall 384, adjacent the discharge end of the initiator device 382.

The bladder 390 preferably is formed of a material sufficiently impervious to the fluid fuel stored therein to prevent undesired mixing of the fuel with the oxidant stored in the adjacent or surrounding combustion chamber 360. In such an assembly and by way of the described use of a fuel bladder, fluid fuel is stored free of combustion oxidant.

In the operation of such an assembly, such as upon the sensing of a collision, an electrical signal is sent to the initiator device 382. In such an assembly, the initiator device will also preferably of a pyrotechnic type. Again in such an assembly, pyrotechnic initiator devices can: 1) advantageously provide sufficient energy, e.g., heat, output to rupture the flexible wall bladder, 2) adequately disperse the fuel in the combustion chamber, and 3) provide sufficient residual heat to ignite the resulting fuel and oxidant mixture.

Such an initiator device will, upon receipt of an appropriate electrical signal, ignite and emit a hot, particle-laden discharge at the surface of the adjacent fuel bladder, resulting in the piercing or otherwise opening of the bladder 390 and the consequent mixing of fuel therefrom with oxidant stored in the combustion chamber 360. That is, the fuel is dispersed into the oxidant and vaporized as a result of the energy output of the initiator device. In turn, residual heat and hot radiant particles issuing forth from the initiator device provide an effective ignition source. The mix of fuel and oxidant then ignites and burns.

As with the above-described embodiments, the hot gas produced upon the burning of the flammable mixture results in a rapid pressure rise within the combustion chamber 360, with the subsequent passage of hot gas through the gas exit opening 370 and into the storage chamber 314. Wherein, the hot combustion gas expelled from the combustion chamber 360 mixes with the pressurized gas stored within the storage chamber 314 to produce inflation gas for use in inflating the inflatable device, e.g., an air bag, in a manner similar to that described above relative to the embodiments illustrated in FIGS. 1 and 2.

It will be appreciated that by appropriately filling the bladder with fuel prior to placement of the bladder within the combustion chamber, e.g., prior to addition of oxidant in the combustion chamber, and subsequently filling the combustion chamber with oxidant at the selected pressure, the filling process is rendered relatively safe and easy.

It is also to be understood that similar fuel-containing bladder inflator assembly designs can be utilized in applications wherein only short term separation of fuel and oxidant is required or desired. For example, such a fuel-containing flexible wall bladder can be used to keep fuel and oxidant separate during the loading and/or sealing (e.g., welding) operations associated with the fabrication of such inflator assemblies, e.g., the loading and sealing of the oxidant chamber which houses the fuel-containing bladder. After such loading and/or sealing it may no longer be necessary or desirable to maintain such separation between the fuel and oxidant. It will be appreciated that in general the structural integrity of the bladder material need not be as great where only a relatively short term separation of fuel and oxidant is required or desired, e.g., the material forming the bladder need only be sufficiently impervious to the fuel to prevent such undesired mixing for a relatively short period of time.

In general, the fluid fuels useable in such assemblies wherein fluid fuel is stored in a storage element free of combustion oxidant can be the same as those described above and including, as described below, various gaseous, liquified gases and liquid fuels.

As described above, in order to reduce the overall size of the inflator assembly and to satisfy performance criteria, oxidants are stored at relatively high pressures. In turn, relative to the use of gaseous fuels, it may be preferred that the gaseous fuel be stored at pressures in the same general range, e.g., nearly equal, as the pressure at which the oxidant is stored. It will be appreciated that as the inflator assembly designs of the invention generally rely on the initiator supplying sufficient energy to effect breaking, burning through, or rupturing of the separation barrier between the fuel and the oxidant, e.g., a rupture disc or fuel bladder wall, storage of gaseous fuels and oxidants at near equal pressures avoids the need for a separation barrier of greater thickness or strength, as would typically be required if the barrier would be required to withstand a large pressure differential for a prolonged period of time. As most potential gaseous fuels normally liquify at such relatively high pressures, preferred gaseous fuels for use in assemblies of the invention wherein fluid fuel is stored in a storage element free of combustion oxidant include hydrogen and methane.

With respect to liquified gas fuels, a factor in the selection of an appropriate fuel material is the liquid-phase expansion characteristics of the material. In general, the fuel material will be selected and the fuel storage element filled sufficiently, such that for designed increases in ambient temperature, such as for abnormal storage at temperatures as high as about 230° F. (110° C.), the fuel storage element will not reach a state where the storage element is completely filled with liquid. With such a storage element nearly completely filled with liquid, upon the subsequent additional heat input such as from an initiator, the liquid within the storage element will have little or no volume available for expansion. Thus, with such additional heat input, the pressure within the storage element will increase and desirably result in the breaking or rupturing of the separation element. In practice, the separation element for use in this aspect of the invention need be sufficiently strong and durable to withstand fatigue such as caused by the expansion and compression of the material stored within the storage element normally associated with and resulting from changes in ambient conditions.

It is to be understood that the designed increase in ambient temperature (e.g., the maximum design ambient temperature can be higher or lower) as well as the strength of the corresponding separation element can be appropriately altered to satisfy the needs for particular applications. For example, in at least some inflator assembly designs it may be desirable that the fuel storage element be filled sufficiently with fuel such that the fuel storage element will reach the state where the storage element is completely filled with liquid at a lower maximum design ambient temperature, e.g., a temperature less than about 230° F. (110° C.).

Liquified gases for use in the practice of the invention can include ethane, propane and butane.

With respect to the use of liquid fuels in such designs wherein the fuel is stored separately from the oxidant, liquid fuels such as those identified above with respect to assemblies wherein fuel and oxidant are stored in a mixed or non-separated condition including ethyl alcohol, can be used.

Figure 4:
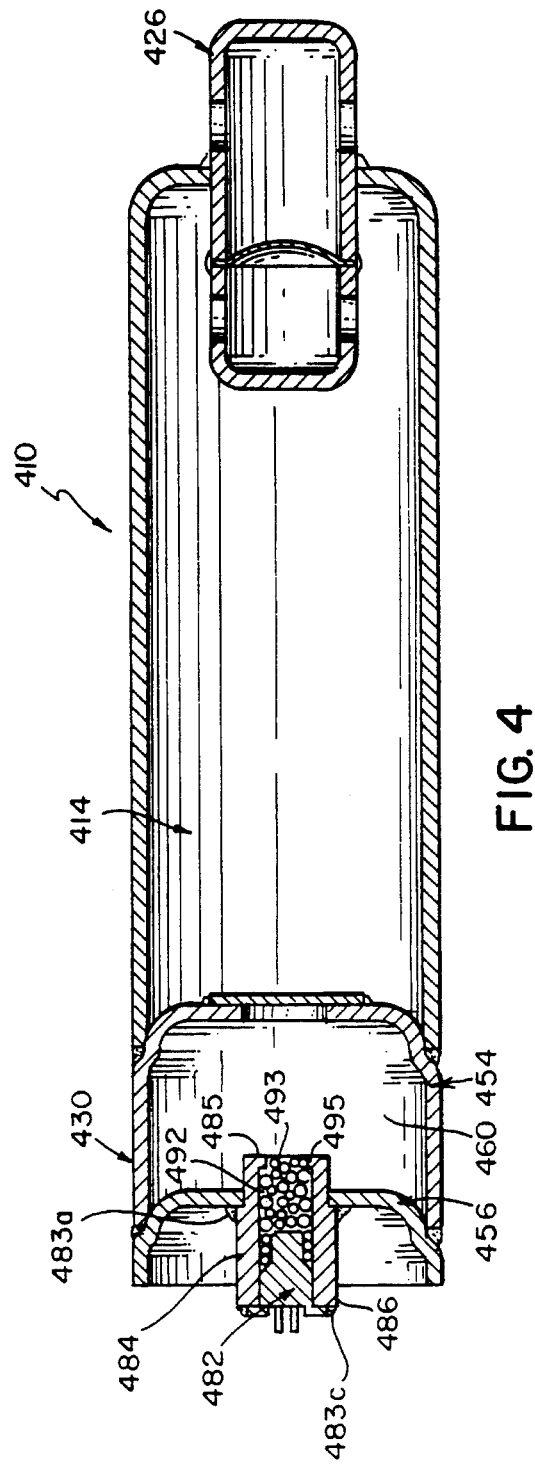
FIG. 4" is a simplified, partially in section schematic drawing showing a fluid fueled inflator in accordance with yet another alternative embodiment of the invention and including mechanical opening means.
Figure 4:
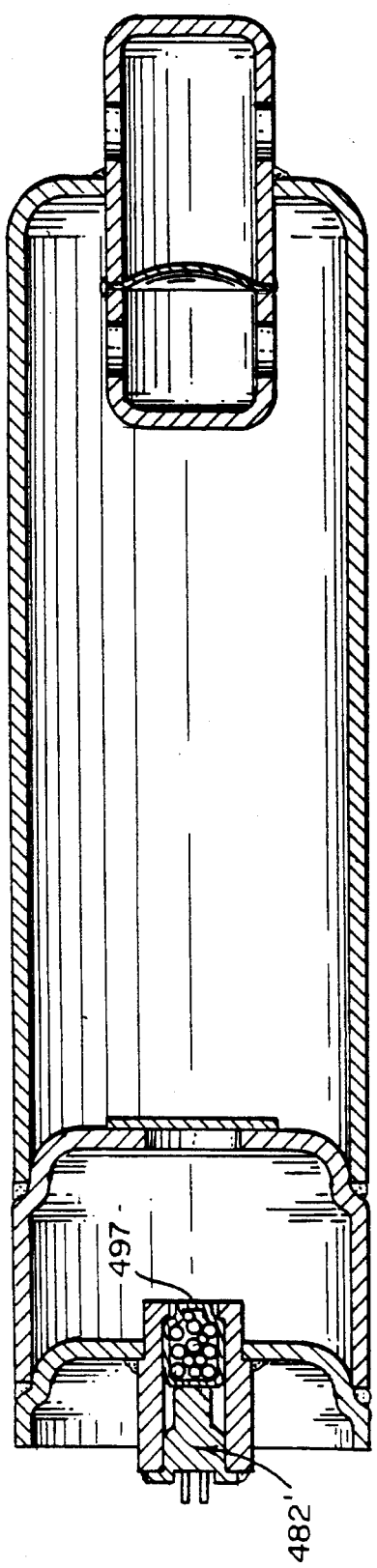

FIG. 4 illustrates a fluid fueled inflator assembly 410 in accordance with yet another alternative embodiment of the invention.

The fluid fueled inflator assembly 410, similar to the inflator assembly 10 described above, includes a storage chamber 414, a diffuser assembly 426, and a combustion chamber assembly 430.

The fluid fueled inflator assembly 410, however, differs from the inflator assembly 10 in that, as described in greater detail below, the assembly 410 includes and utilizes a source of supplemental fuel.

Specifically, as shown in FIG. 4, the combustion chamber assembly 430 though also including similar combustion chamber assembly cap and base portions, 454 and 456, respectively, includes an annular cylindrical wall 484, having a first and a second end, 485 and 486, respectively, and defining a supplemental fuel source storage chamber 492, wherein is normally stored or housed a supplemental fuel source charge 493 in close proximity to the initiator device 482, that is adjacent the discharge portion of the initiator device.

The wall 484 is attached in sealing relation within the combustion chamber 460 via a weld 483a at the base cap opening 480. The first end 485 includes a chamber lip 495 to assist in maintaining the supplemental fuel source charge 493 within the chamber 492. To the second end 486 is attached, in sealing relation via a weld 483c, an initiator device 482, such as described in greater detail below.

In the operation of such an assembly, such as upon the sensing of a collision, an electrical signal is sent to the initiator device 482. The initiator device 482 will, in turn cause the supplemental fuel source material to release the supplemental fuel into the combustion chamber 460 to mix with fuel and oxidant stored therein to form a combustible mixture. The output of initiator device 482 will also serve to ignite the combustible mixture and thereafter operation of such inflator assembly will be similar to the inflator assembly 10, described above.

In practice, supplemental fuel source materials used in the practice of the invention are generally characterized by having the ability to release hydrogen gas or a hydrocarbon-based fuel material or mix, upon exposure to heat. Suitable supplemental fuel source materials for use in the practice of the invention are generally solids and can thus facilitate handling and storage. Suitable supplemental fuel source materials can include one or more metal hydrides. A preferred metal hydride for use is lithium hydride.

In such assembly designs, the supplemental fuel source material can be stored such that it is loosely arranged or tightly packed near or adjacent the ignition device and directly exposed to the exhaust products, including heat, generated or created by the ignition device.

It is to be understood, however, that the supplemental fuel source material can, if desired, be stored in a separate chamber such as a flexible wall container 497, as shown in FIG. 4', in close proximity to the initiator device 482'. As with the above-described fuel bladder design, the use of a flexible wall housing made of a material that is impervious to water yet burns relatively easily can facilitate or minimize the handling of the supplemental fuel source material, particularly for those supplemental fuel source materials that are water sensitive, such as various metal hydrides.

As the presence of hydrogen gas in proper proportions and at selected conditions with a hydrocarbon fuel and oxidant mixture can generally lead to more complete combustion through higher flame temperatures and enhanced flame speed, the use of a supplemental fuel source material such as a metal hydride which releases hydrogen gas can result in an inflator assembly having lower emissions of pollutants, e.g. lower emissions of incomplete combustion products, and resulting in a quicker deployment of the air bag as the enhance flame speed can reduce the period of time before the gas begins to flow into the air bag.

With such supplemental fuel source materials, fuel is stored in a bound state such that the fuel can not normally be released unless contacted by an energy output of another source, such as an initiator, or subjected to a different environment. As such supplemental materials can provide a significant proportion of the fuel requirements for the inflator assembly, the relative amount of fuel required to be stored in the combustion chamber in mixture with the oxidant can be significantly reduced and, in turn, problems associated with the long-term storage of such fuel/oxidant mixtures (e.g., autoignition) can also be desirably reduced. Consequently, such use and inclusion of a supplemental fuel source material in inflator assemblies wherein fuel and oxidant can mix during storage can help ensure that such fuel-oxidant mixture can safely be stored for extended periods of time.

It is to be appreciated that the sealing means used in the practice of the invention can include means that are pressure sensitive as well as means that are pressure independent, such as rely on a mechanical means such as a projectile to effect rupture of a disc, for example. Further, assemblies can be made so as to include one or more sealing means which is pressure sensitive and/or one or more sealing means that is pressure independent.

FIG. 4" illustrates a fluid fueled inflator assembly 410" similar to the inflator assembly 10 described above and wherein mechanical means, e.g., a projectile 498" such as fired by an initiator 499", is used to effect rupture of a disc 450" which serves to separate the contents of the storage chamber 414" from the air bag (not shown).

For example, upon the use of a pressure sensitive sealing means, such as a rupture disc designed to rupture at a selected pressure, for the combustion chamber, the combustion of the fluid fuel and the oxidant therein results in an increase in the pressure within the chamber. When the chamber pressure exceeds the rupture pressure of the disc, the disc will rupture to permit the passage of the combustion products through the resulting opening.

Similarly, upon the use of a pressure sensitive sealing means, such as a rupture disc designed to rupture at a selected pressure, for sealing exit from the storage chamber (such as within the diffuser assembly), the mixing of the expelled hot combustion gas with the pressurized stored gas in the chamber to produce inflation gas also results in an increase in the pressure within the chamber. When the chamber pressure exceeds the rupture pressure of the disc, the disc will rupture to permit the passage of the inflation gas from the chamber to inflate the inflatable safety device.

Each of FIGS. 5A, 5B, and 5C are simplified schematic drawings of alternative initiator devices (582a, 582b, and 582c, respectively), such as are known in the art and as can be used in a fluid fueled inflator in accordance with the invention.

The initiator device 582a, illustrated in FIG. 5A, is a pyrotechnic initiator and, as is known, includes an electrical pin connection 501a, a connector 502a, a body portion 503a and a pyrotechnic charge-containing portion 504a.

In the typical operation of such a pyrotechnic initiator, upon the receipt of a proper electrical signal, electric current is passed through a small wire in contact with the pyrotechnic charge housed within the initiator. The heat generated by the passage of the current through the wire causes the pyrotechnic charge to react. Such reaction results in the discharge of heat and radiant particles into the surrounding environment.

It will be also be appreciated that in a pyrotechnic initiator if desired, such a pyrotechnic charge can be ignited by alternative means such as by means of a mechanical primer, for example.

The initiator device 582b, illustrated in FIG. 5B, is a spark discharge initiator and, as is known, includes an electrical pin connection 501b, a connector 502b, a body portion 503b, and first and second electrodes, 505b and 506b, respectively, spaced apart to form a spark gap 507b.

In the typical operation of such a spark discharge initiator, upon the receipt of a proper electrical signal, a high voltage potential is applied across the electrodes of the device. For a given amount of energy, an electric discharge will develop across the electrode gap. In practice, such an amount of energy will be dependent on a number of factors relating to the electrodes including: the characteristics of the surrounding environment, the materials of construction and the geometry thereof, for example. The resulting high energy, high temperature, ionized gas or plasma constituting the region of discharge effectively transfers energy to the surrounding environment, resulting in ignition of the flammable mixture.

The initiator device 582c, illustrated in FIG. 5C, is a heated element initiator and, as is known, includes an electrical pin connection 501c, a connector 502c, a body portion 503c, spaced apart first and second electrodes, 505c and 506c, respectively, joined together by a wire element 508c.

In the typical operation of such a heated element initiator, upon the receipt of a proper electrical signal, electric current is passed through the wire element which is in direct contact with the surrounding environment. Generally, such initiators are commonly designed such that the wire is either suspended above or laying directly on the body of the initiator. The electric current passing through the wire causes the wire to heat rapidly and, dependent on factors such as the dimensions and type of wire, can cause the wire to vaporize. Thus, energy is rapidly transferred to the surrounding media resulting in ignition of the flammable mixture.

The present invention is described in further detail in connection with the following examples which illustrate various aspects involved in the practice of the invention. It is to be understood that all changes that come within the spirit of the invention are desired to be protected and thus the invention is not to be construed as limited by these examples.

EXAMPLES

EXAMPLES 1–3

Identical inflators, each containing a mix of a fluid fuel component (i.e., the above-identified denatured ethanol, "ANHYDROL SOLVENT SPECIAL, PM-4061, 190 Proof" sold by Union Carbide Chemicals and Plastics Company Inc.) and an oxidant component, were conditioned at three different temperature conditions. Each of the inflators was then deployed into a rigid tank having a volume of 100 liters and the tank pressure as a function of time was monitored.

The inflator structure used in each case was the same and included a 2 in$^3$ (32.8 cc) cylindrical combustion chamber and a 12 in$^3$ (196.6 cc) inert gas storage chamber containing a mixture of 98% Ar and 2% He at 2700 psig (18.6 MPa) at 70° F. (21° C.).

In each of these examples, the combustion chamber was first filled with a stoichiometric amount of the fuel and then filled with an oxidant component gas mixture of 65% $O_2$ and 35% Ar until the internal pressure within the combustion chamber was 1400 psig (9.6 MPa) at 70° F. (21° C.).

After being appropriately filled with the fuel, oxidant and inert gas, in each case the inflator device was conditioned in a chamber maintained at the appropriate selected temperature for 2 hours. The three selected temperature test conditions employed were:

EXAMPLE 1 at –40° F. (–40° C.),

EXAMPLE 2 at 70° F. (21° C.), and

EXAMPLE 3 at 193° F. (90° C.).

DISCUSSION OF RESULTS

FIG. 6 presents the tank pressure as a function of time obtained in Examples 1–3:

| EXAMPLE | TEMPERATURE (°C.) | LINE |
|---------|-------------------|------|
| 1       | –40               | A    |
| 2       | 21                | B    |
| 3       | 90                | C    |

In all three cases an acceptable tank pressure was achieved to adequately inflate a typical driver-sized air bag, as dictated by specific pressure versus time requirements. For example, a maximum tank pressure of between 13 psig (89.6 kPa) and 19 psig (131 kPa) was achieved within 70 milliseconds.

It is important to note that neither the period of time before gas flow into the tank is initiated (termed the "delay time") nor the final pressure attained in the tank were significantly effected by the changes in ambient temperatures.

EXAMPLE 4

In this example, the tank pressure as a function of time was again monitored but this time for an inflator wherein the fuel, i.e., the above-identified denatured ethanol, "ANHYDROL SOLVENT SPECIAL, PM-4061, 190 Proof" sold by Union Carbide Chemicals and Plastics Company Inc., was stored in a chamber separate and apart from the chamber, i.e., the combustion chamber, in which the oxidant component was stored. A thin (0.1 mm thick) rupturable aluminum disc was used to separate the fuel storage chamber and the combustion chamber. The combustion chamber (6 in$^3$, 98.3 cc) was filled to a pressure of 1000 psig (6.9 MPa) with a mixture of 50% $O_2$ and 50% Ar.

In this case, the inert gas storage chamber (volume=12 in$^3$, 196.6 cc) was filled with a 4200 psig (29.0 MPa) mixture of 98% Ar and 2% He.

This example was conducted using the same test hardware and instrumentation used in EXAMPLES 1–3, described above.

DISCUSSION OF RESULTS

FIG. 7 presents the tank pressure as a function of time obtained in Example 4 and clearly shows that acceptable delay times (e.g., 3.7 milliseconds) were realized using an inflator assembly wherein the fuel is stored separately from the oxidant, in accordance with the invention.

The inflator assemblies described herein can, for example, afford a number of advantages including:

a) Through the use of fluid fuels, inflation gas containing little or no particulate can be produced.

b) Such assemblies are adaptable to the use therein of a variety of fuel and fuel mix materials and can thus incorporate various readily available and low cost fuel materials.

c) A variety of oxidant and oxidant mix materials can also be used in such inflator assemblies and thus provide greater design and production flexibility.

d) Such assembly designs are adaptable to modification, such as the use of supplemental fuel source materials or fuel and oxidant separation, to provide increased design and production flexibility.

e) Such assemblies provide a low cost solution to many inflator needs.

f) Such assemblies, such as through expansion of combustion products into a stored gas, provide inflation gas at a relatively low temperature, thereby avoiding the above-identified types of problems associated with inflator designs having high temperature emissions.

g) Such assemblies also provide air bag inflation gas having a sufficiently low concentration incomplete products of combustion.

The invention illustratively disclosed herein suitably may be practiced in the absence of any element, part, step, component, or ingredient which is not specifically disclosed herein. The foregoing detailed description is given for clearness of understanding only, and no unnecessary limitations are to be understood therefrom, as modifications within the scope of the invention will be obvious to those skilled in the art.

What is claimed is:

1. An apparatus for inflating an inflatable device, said apparatus comprising:

a pressurized first chamber wherein at least one fuel in the form of a fluid and at least one oxidant are burned to produce combustion products including hot combustion gas, said first chamber including at least one gas exit opening and having sealing means normally closing said gas exit opening, the combustion of said fluid fuel and said oxidant increasing the temperature and pressure within said first chamber, said first chamber sealing means adapted to open when a predetermined increase in pressure within said first chamber is realized, whereby at least a portion of said hot combustion gas is expelled from said first chamber, a second chamber containing a supply of pressurized stored gas, said second chamber in fluid communication with said first chamber upon the opening of said gas exit opening sealing means, said hot combustion gas expelled from said first chamber mixing with said pressurized stored gas to produce inflation gas, said second chamber including at least one gas exit port and having sealing means normally closing said gas exit port, the mixing of said hot combustion gas with said pressurized stored gas increasing the temperature and pressure within said second chamber, said second chamber sealing means adapted to open when a predetermined increase in pressure within said second chamber is realized after said hot combustion gas expelled from said first chamber mixes with said pressurized stored gas to produce said inflation gas, whereby at least a portion of said inflation gas is expelled from said second chamber to inflate said device, and initiator means for initiating the burning of said at least one fluid fuel and said at least one oxidant.

2. The apparatus of claim 1 wherein said fluid fuel comprises a gaseous form.

3. The apparatus of claim 1 wherein said fluid fuel comprises a liquid form.

4. The apparatus of claim 1 wherein said fluid fuel comprises $H_2$.

5. The apparatus of claim 1 wherein said fluid fuel comprises a hydrocarbon-based fuel.

6. The apparatus of claim 5 wherein said hydrocarbon-based fuel is selected from the group consisting of naphthenic, olefinic and paraffinic hydrocarbon groups.

7. The apparatus of claim 6 wherein said hydrocarbon-based fuel is a $C_1$–$C_4$ paraffinic hydrocarbon fuel.

8. The apparatus of claim 5 wherein said hydrocarbon-based fuel is selected from the group consisting of alcohols, ethers, and esters.

9. The apparatus of claim 8 wherein said hydrocarbon-based fuel comprises no more than four carbon atoms.

10. The apparatus of claim 9 wherein said hydrocarbon-based fuel is selected from the group of ethyl and propyl alcohol.

11. The apparatus of claim 5 wherein said hydrocarbon-based fuel includes a minor amount of water therewith.

12. The apparatus of claim 1 having an equivalence ratio in the range of $0.4 \leq \phi \leq 1.6$.

13. The apparatus of claim 1 additionally comprising a supplemental fuel source storage chamber proximate said initiator means and containing a supply of supplemental fuel source material, whereby said initiator means initiates release of a supplemental fuel from said supplemental fuel source material into said first chamber, said supplemental fuel mixing with said fluid fuel and said oxidant to form a combustible mixture burned to produce said combustion products.

14. The apparatus of claim 13 wherein said supplemental fuel source material comprises at least one metal hydride.

15. The apparatus of claim 13 wherein said supplemental fuel source material comprises lithium hydride.

16. The apparatus of claim 1 additionally comprising a fluid fuel storage element storing said at least one fluid fuel free of combustion oxidant, said fluid fuel storage element comprising a rupturable flexible wall bladder comprised of material impervious to said at least one fluid fuel and wherein said at least one fluid fuel is stored free of combustion oxidant, said bladder housed within said first chamber and with said initiator means first rupturing said rupturable wall bladder and then initiating the burning of said at least one fluid fuel and said at least one oxidant in said first chamber.

17. The apparatus of claim 1 additionally comprising a fluid fuel storage element storing said at least one fluid fuel free of combustion oxidant, said fluid fuel storage element comprising a sealed storage chamber wherein said at least one fluid fuel is stored free of combustion oxidant, said sealed storage chamber including at least one fuel exit opening, sealing means normally closing said fluid exit opening, and opening means to open said fuel exit opening sealing means, said storage chamber in fluid communication with said first chamber upon the opening of said at least one fuel exit opening.

18. The apparatus of claim 1 wherein said initiator means comprises an initiator device selected from the group of spark discharge, heated element, and pyrotechnic.

19. The apparatus of claim 1 wherein at least one of said first chamber sealing means and said second chamber sealing means is pressure sensitive, wherein when the first chamber sealing means is pressure sensitive, the increase in pressure within said first chamber upon the combustion of said fluid fuel and said oxidant effects the opening of said first chamber sealing means and wherein when the second chamber sealing means is pressure sensitive, the increase in pressure within said second chamber upon the mixing of said hot combustion gas with said pressurized stored gas effects the opening of said second chamber sealing means.

20. The apparatus of claim 1 wherein at least one of said first chamber sealing means and said second chamber sealing means is adapted to open by mechanical means.

21. An apparatus for inflating an inflatable device, said apparatus comprising:

a fluid fuel storage element storing at least one fuel in the form of a fluid and free of oxidant, said fuel selected from the group of $H_2$ and hydrocarbon-based fuels selected from the group consisting of naphthenic, olefinic and paraffinic hydrocarbon groups and alcohols, ethers, and esters, a first chamber wherein said at least one fluid fuel and at least one oxidant are burned to produce combustion products including hot combustion gas, said first chamber including at least one gas exit opening and having sealing means normally closing said gas exit opening, the combustion of said fluid fuel and said oxidant increasing the temperature and pressure within said first chamber, said first chamber sealing means adapted to open when a predetermined increase in pressure within said first chamber is realized, whereby at least a portion of said hot combustion gas is expelled from said first chamber, a second chamber containing a supply of pressurized stored gas, said second chamber in fluid communication with said first chamber upon said opening of said gas exit opening sealing means, said hot combustion gas expelled from said first chamber mixing with said pressurized stored gas to produce inflation gas, said second chamber including at least one gas exit port and having sealing means normally closing said gas exit port, said second chamber sealing means adapted to open when a predetermined increase in pressure within said second chamber is realized after said hot combustion gas expelled from said first chamber mixes with said pressurized stored gas to produce said inflation gas, whereby at least a portion of said inflation gas is expelled from said second chamber to inflate said device, and initiator means for initiating the burning of said at least one fluid fuel and said at least one oxidant, and wherein at least one of said first chamber sealing means and said second chamber sealing means is pressure sensitive, wherein when the first chamber sealing means is pressure sensitive, the increase in pressure within said first chamber upon the combustion of said fluid fuel and said oxidant effects the opening of said first chamber sealing means and wherein when the second chamber sealing means is pressure sensitive, the increase in pressure within said second chamber upon the mixing of said hot combustion gas with said pressurized stored gas effects the opening of said second chamber sealing means.

22. The apparatus of claim 21 wherein said fluid fuel storage element comprises a rupturable flexible wall bladder comprised of material impervious to said at least one fluid fuel and wherein said at least one fluid fuel is stored free of oxidant, said bladder housed within said first chamber and with said initiator means first rupturing said rupturable wall bladder and then initiating the burning of said at least one fluid fuel and said at least one oxidant in said first chamber.

23. The apparatus of claim 21 wherein said fluid fuel storage element comprises a sealed storage chamber wherein said at least one fluid fuel is stored free of oxidant, said sealed storage chamber including at least one fuel exit opening, sealing means normally closing said fluid exit opening, and opening means to open said fuel exit opening sealing means, said storage chamber in fluid communication with said first chamber upon the opening of said at least one fuel exit opening.

24. A method for inflating an inflatable safety device in a vehicle, said method comprising the steps of:

burning at least one fuel in the form of a fluid with at least one oxidant in a pressurized first sealed chamber to produce combustion products including hot combustion gas, wherein the first sealed chamber includes at least one gas exit opening normally closed by a sealing means, said burning increasing the temperature and pressure within the first chamber, opening the first chamber sealing means when a predetermined increase in pressure within said first chamber is realized to expel the hot combustion gas from the first chamber into a second chamber containing a supply of pressurized stored gas, mixing the expelled hot combustion gas with the pressurized stored gas in the second chamber to produce inflation gas, wherein the second chamber includes at least one gas exit port normally closed by a sealing means, said mixing increasing the temperature and pressure within the second chamber, and opening the second chamber port sealing means, after said hot combustion gas expelled from said first chamber has mixed with said pressurized stored gas to produce the inflation gas and when a predetermined increase in pressure within said second chamber is realized, to expel the inflation gas from the second chamber to inflate the inflatable safety device.

25. The method of claim 24 wherein the fluid fuel comprises a gaseous form.

26. The method of claim 24 wherein the fluid fuel comprises a liquid form.

27. The method of claim 24 wherein said fluid fuel comprises $H_2$.

28. The method of claim 24 wherein the fluid fuel comprises a hydrocarbon-based fuel.

29. The method of claim 28 wherein the hydrocarbon-based fuel is selected from the group consisting of naphthenic, olefinic and paraffinic hydrocarbon groups.

30. The method of claim 29 wherein the hydrocarbon-based fuel is a $C_1$–$C_4$ paraffinic hydrocarbon fuel.

31. The method of claim 28 wherein the hydrocarbon-based fuel is selected from the group consisting of alcohols, ethers, and esters.

32. The method of claim 31 wherein the hydrocarbon-based fuel comprises no more than four carbon atoms.

33. The method of claim 32 wherein the hydrocarbon-based fuel is selected from the group of ethyl and propyl alcohol.

34. The method of claim 28 wherein the hydrocarbon-based fuel includes a minor amount of water therewith.

35. The method of claim 24 operated at an equivalence ratio in the range of $0.4 \leq \phi \leq 1.6$.

36. The method of claim 24 additionally comprising the step of initiating release into the first chamber of a supplemental fuel from a supplemental fuel source material, the supplemental fuel mixing with the fluid fuel and the oxidant to form a combustible mixture for said burning to produce combustion products.

37. The method of claim 36 wherein the supplemental fuel source material comprises at least one metal hydride.

38. The method of claim 36 wherein the supplemental fuel source material comprises lithium hydride.

39. The method of claim 24 wherein the at least one fluid fuel is stored free of combustion oxidant in a rupturable flexible wall bladder comprised of material impervious to the at least one fluid fuel, with the bladder housed within the first chamber, the method additionally comprising the step of rupturing the bladder to release the fuel to contact the oxidant prior to said burning.

40. The method of claim 24 wherein the at least one fluid fuel is stored free of combustion oxidant in a sealed storage chamber including at least one fuel exit opening having sealing means normally closing the fuel exit opening, the method additionally comprising the step, prior to said burning, of opening the sealing means to permit the fluid fuel to be in communication with the oxidant in the first chamber.

41. The method of claim 24 wherein said burning is initiated by means of an initiator device selected from the group of spark discharge, heated element, and pyrotechnic.

42. The method of claim 24 wherein at least one of the first and second chamber sealing means is pressure sensitive, wherein when the first chamber sealing means is pressure sensitive, the increase in pressure within the first chamber upon said burning of the fluid fuel and the oxidant effects the opening of said first chamber sealing means and wherein when the second chamber sealing means is pressure sensitive, the increase in pressure within the second chamber upon the mixing of the hot combustion gas with the pressurized stored gas effects the opening of the second chamber sealing means.

43. The method of claim 24 wherein at least one of the first and second chamber sealing means is opened by mechanical means.

* * * * *